B. H. JONES.
CASTER SOCKET.
APPLICATION FILED OCT. 5, 1914.

1,141,342.

Patented June 1, 1915.

Witnesses:
Edgar S. Farmer
A. M. Holcombe

Inventor:
Benjamin H. Jones,
by
his Attys.

UNITED STATES PATENT OFFICE.

BENJAMIN H. JONES, OF ST. LOUIS, MISSOURI.

CASTER-SOCKET.

1,141,342. Specification of Letters Patent. Patented June 1, 1915.

Application filed October 5, 1914. Serial No. 864,980.

*To all whom it may concern:*

Be it known that I, BENJAMIN H. JONES, a citizen of the United States, and a resident of the city of St. Louis and State of Missouri, have invented a new and useful Improvement in Caster-Sockets, of which the following is a specification.

This invention relates to spring sockets for retaining casters in the holes provided for the purpose in the legs of beds, tables and other movable articles.

The object of the invention is a caster socket which is simple, inexpensive, easily applied to all kinds of furniture, and which holds the caster securely in place.

Another object is a spring socket which will fit holes of different sizes interchangeably.

A further object of the invention is the caster and socket construction shown in the accompanying drawings.

Figure 1:
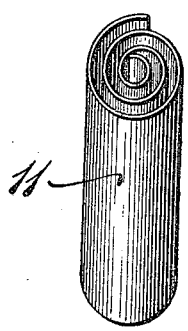
Figure 3:
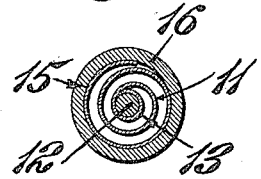
Figure 2:
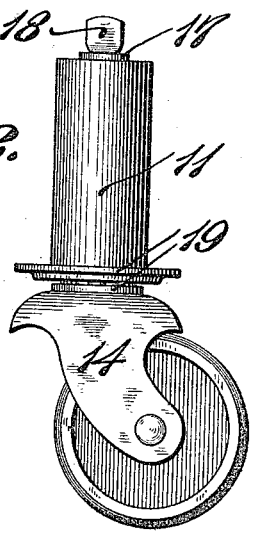
Figure 4:
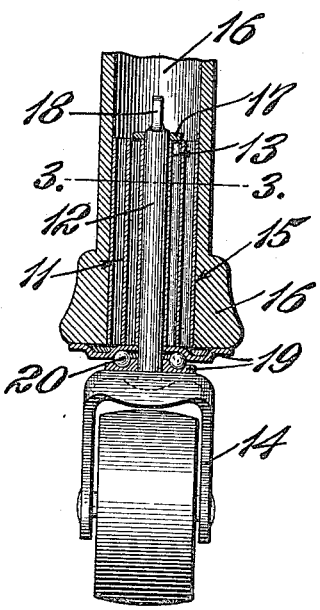

In the drawings, in which like reference characters designate the same parts in the several views, Figure 1 is a perspective view of a socket embodying the invention; Fig. 2 is a side elevation of a caster and socket: Fig. 3 is a cross-section of a caster and socket assembled in a bed post, on the line 3—3 in Fig. 4; Fig. 4 is a longitudinal section of the same, showing the caster in side elevation; and Fig. 5 is a view similar to Fig. 3, showing a square post.

Referring to Figs. 1 to 4 inclusive, the socket 11 consists of a strip of sheet steel or other suitable material, which is wound in an open coil, the inner convolution 12 thereof having a diameter equal to the diameter of the swivel pin or pintle 13 of the caster 14, and the outer convolution 15 thereof having a diameter slightly greater than the inside diameter of the post 16. The socket is arranged on the pintle of the caster and is secured in place by means of a washer 17, which is placed on the end of the pintle against the end of the socket. The extremity of the pintle is flattened, forming shoulders 18 which prevent the washer and socket from slipping off from the pintle. A ball thrust bearing, consisting of thrust plates 19 arranged on the pintle, and balls 20 between the thrust plates, is placed between the socket and the caster to support the principal load on the caster. The thrust plates 19 bear against the end of the post and the top face of the caster yoke, respectively.

Figure 5:
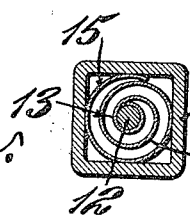

In Fig. 5 there is shown the same socket 11 compressed into a square post 21. The preferred shape of the socket 11 is a flat spiral of several convolutions, and this shape provides sufficient freedom of movement of the free end 15 of the socket to enable it to conform to the square interior of the post and causes it to bear snugly against all four sides of the post. The shape of the socket adapts it for providing a good lateral bearing for the caster pintle in any hole of symmetrical shape. The open spiral form of the socket admits of winding up the strip and thereby effecting considerable variation in diameter to suit holes differing considerably in size. The invention is not restricted to the precise shapes and arrangement of the parts shown in the drawings.

I claim the following as my invention:

A socket for a caster, said socket comprising a spiral consisting of several turns of resilient metal, the outer convolutions of said spiral being spaced apart and the inner convolution terminating in a coil to receive a pintle.

Signed at St. Louis, Mo., this 2nd day of October, 1914.

BENJAMIN H. JONES.

Witnesses:
 M. A. SHELTON,
 A. M. HOLCOMBE.

Copies of this patent may be obtained for five cents each, by addressing the "Commissioner of Patents, Washington, D. C."